US011715106B2

(12) United States Patent
Allbright

(10) Patent No.: US 11,715,106 B2
(45) Date of Patent: Aug. 1, 2023

(54) SYSTEMS AND METHODS FOR REAL-TIME INSTITUTION ANALYSIS BASED ON MESSAGE TRAFFIC

(71) Applicant: Mastercard International Incorporated, Purchase, NY (US)

(72) Inventor: Joshua A. Allbright, Valley Park, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 257 days.

(21) Appl. No.: 16/837,838

(22) Filed: Apr. 1, 2020

(65) Prior Publication Data
US 2021/0312452 A1   Oct. 7, 2021

(51) Int. Cl.
| | |
|---|---|
| *G06Q 20/40* | (2012.01) |
| *G06F 7/08* | (2006.01) |
| *G06F 16/23* | (2019.01) |
| *G06N 20/00* | (2019.01) |
| *G06N 5/04* | (2023.01) |

(Continued)

(52) U.S. Cl.
CPC ........... *G06Q 20/4016* (2013.01); *G06F 7/08* (2013.01); *G06F 16/2379* (2019.01); *G06N 5/04* (2013.01); *G06N 20/00* (2019.01); *G06Q 30/0204* (2013.01); *G06Q 30/018* (2013.01)

(58) Field of Classification Search
CPC ............. G06Q 20/405; G06Q 30/0204; G06Q 20/4016; G06Q 20/20; G06Q 20/34; G06Q 30/018; G06F 16/2379; G06F 7/08; G06N 20/00; G06N 5/04
See application file for complete search history.

(56) References Cited

U.S. PATENT DOCUMENTS

| | | |
|---|---|---|
| 6,601,048 B1 | 7/2003 | Gavan et al. |
| 6,938,003 B2 | 8/2005 | Harpale |

(Continued)

OTHER PUBLICATIONS

PCT International Search Report and Written Opinion, Application No. PCT/US2021/023576, dated Jun. 24, 2021, 9 pps.

(Continued)

*Primary Examiner* — Scott S Trotter
(74) *Attorney, Agent, or Firm* — Armstrong Teasdale LLP

(57) ABSTRACT

A message tracking computing device for identifying anomalous activity in real-time is provided. The message tracking computing device is programmed to receive real-time transaction data including a plurality of transaction records. Each transaction record associated with a payment transaction. The message tracking computing device is also programmed to sort the plurality of transaction records into a plurality of channels. The message tracking computing device is further programmed to compute, for each channel, a normalized velocity score by computing a streaming mean, computing a streaming standard deviation, and computing the normalized velocity score based on the streaming mean, the streaming standard deviation, and a transaction ratio. In addition, the message tracking computing device is programmed to analyze the computed normalized velocity score for each channel to detect anomalous activity, automatically generate an alert message identifying the anomalous activity, and transmit the alert message to a remote computing device.

18 Claims, 7 Drawing Sheets

(51) Int. Cl.
*G06Q 30/0204* (2023.01)
*G06Q 30/018* (2023.01)

(56) References Cited

U.S. PATENT DOCUMENTS

| | | |
|---|---|---|
| 7,263,506 B2 | 8/2007 | Lee et al. |
| 7,527,195 B2 | 5/2009 | Keithley et al. |
| 7,788,195 B1 | 8/2010 | Subramanian et al. |
| 7,835,863 B2 | 11/2010 | Lokshin et al. |
| 8,001,042 B1 | 8/2011 | Brunzell et al. |
| 8,104,679 B2 | 1/2012 | Brown |
| 8,402,098 B2 | 3/2013 | Dircz |
| 8,531,180 B2 | 9/2013 | Piemonte et al. |
| 8,566,234 B2 | 10/2013 | Hoefelmeyer |
| 8,788,193 B2 | 7/2014 | Fauci et al. |
| 9,210,183 B2 | 12/2015 | Sadovsky et al. |
| 9,243,916 B2 | 1/2016 | Roumeliotis |
| 9,347,205 B2 | 5/2016 | Kosarav et al. |
| 9,596,264 B2 | 3/2017 | Sandke et al. |
| 9,858,575 B2 | 1/2018 | Meredith et al. |
| 9,978,067 B1 | 5/2018 | Sadaghiani et al. |
| 10,015,178 B2 | 7/2018 | Schulman et al. |
| 10,063,654 B2 | 8/2018 | Kirti et al. |
| 10,075,464 B2 | 9/2018 | Kesin et al. |
| 10,482,464 B1* | 11/2019 | Dietrich ............ G06Q 20/4016 |
| 10,586,235 B2 | 3/2020 | Wang et al. |
| 2001/0049690 A1 | 12/2001 | McConnell et al. |
| 2003/0236652 A1 | 12/2003 | Scherrer et al. |
| 2005/0193281 A1 | 9/2005 | Ide et al. |
| 2007/0038568 A1 | 2/2007 | Greene et al. |
| 2007/0294187 A1 | 12/2007 | Scherrer |
| 2008/0133407 A1 | 6/2008 | Guillory et al. |
| 2010/0169192 A1 | 7/2010 | Zoldi et al. |
| 2010/0305993 A1 | 12/2010 | Fisher |
| 2011/0016052 A1 | 1/2011 | Scragg |
| 2011/0225076 A1 | 9/2011 | Wang et al. |
| 2012/0096549 A1 | 4/2012 | Amini et al. |
| 2012/0101940 A1 | 4/2012 | Brennan et al. |
| 2012/0197802 A1 | 8/2012 | Smith et al. |
| 2013/0024361 A1 | 1/2013 | Choudhuri et al. |
| 2013/0054438 A1 | 2/2013 | Boding |
| 2013/0132275 A1 | 5/2013 | Enzaldo et al. |
| 2013/0291099 A1 | 10/2013 | Donfried et al. |
| 2014/0188638 A1 | 7/2014 | Jones et al. |
| 2014/0283005 A1 | 9/2014 | Avni et al. |
| 2014/0324677 A1 | 10/2014 | Walraven et al. |
| 2015/0095247 A1 | 4/2015 | Duan |
| 2015/0220619 A1 | 8/2015 | Gray et al. |
| 2015/0317515 A1 | 11/2015 | Lake, II et al. |
| 2016/0005029 A1* | 1/2016 | Ivey .................. G09C 1/00 705/44 |
| 2016/0042353 A1 | 2/2016 | Canis et al. |
| 2016/0042354 A1 | 2/2016 | Canis et al. |
| 2016/0063501 A1 | 3/2016 | Kalyan et al. |
| 2016/0260100 A1 | 9/2016 | Wiesman |
| 2017/0103340 A1 | 4/2017 | Zoldi et al. |
| 2017/0111364 A1 | 4/2017 | Rawat |
| 2017/0140382 A1 | 5/2017 | Chari et al. |
| 2017/0148025 A1 | 5/2017 | Le et al. |
| 2017/0177937 A1 | 6/2017 | Harmsen et al. |
| 2017/0270529 A1 | 9/2017 | Ebel et al. |
| 2018/0082371 A1 | 3/2018 | Chandler |
| 2018/0121922 A1 | 5/2018 | Zoldi et al. |
| 2019/0073647 A1 | 3/2019 | Zoldi et al. |
| 2019/0114624 A1 | 4/2019 | Piel |
| 2019/0173893 A1 | 6/2019 | Muddu et al. |
| 2019/0220863 A1 | 7/2019 | Novick et al. |
| 2019/0236608 A1 | 8/2019 | Formsma et al. |
| 2019/0295087 A1 | 9/2019 | Jia et al. |
| 2019/0392450 A1 | 12/2019 | Gosset et al. |
| 2020/0074472 A1* | 3/2020 | Adjaoute ............... G06N 5/003 |
| 2020/0167784 A1* | 5/2020 | Kursun ............... G06F 16/9024 |
| 2021/0142335 A1 | 5/2021 | Riffert et al. |

OTHER PUBLICATIONS

PCT International Search Report and Written Opinion, Application No. PCT/US2021/023573, dated Jul. 1, 2021, 6 pps.
PCT International Search Report and Written Opinion, Application No. PCT/US2021/024056, dated Jul. 1, 2021, 6 pps.
PCT International Search Report and Written Opinion, Application No. PCT/US2021/024056, dated Jun. 24, 2021, 7 pps.

* cited by examiner

SYSTEMS AND METHODS FOR REAL-TIME INSTITUTION ANALYSIS BASED ON MESSAGE TRAFFIC

BACKGROUND

The present application relates generally to a technology that may be used to assist in tracking computer messages, and more particularly, to network-based systems and methods for tracking and analyzing message traffic in real-time to rapidly identify a potential bank failure.

The failure rate for financial institutions is low. However, the ramifications of such a failure can be severe. There may be indicators before a financial institution is about to fail. Many current methods of detecting financial institution failure and/or insolvency have a very high false positive rate. These known systems may be tricked by busy days of the week at the financial institution or busy days of a month or holidays. Too many false positives cause these methods to be less useful as the alerts are ignored after a while.

Computer-based networks typically include multiple parties transmitting large volumes of messages between one another. To perform data analytics (e.g., to identify anomalous activity) one or more parties may desire to track a number of a particular type of message within a predetermined time period. During this message tracking, if a number of messages processed over the time period satisfies an alert criteria (e.g., by exceeding a predetermined threshold), an alert may be generated that indicates the possibility of anomalous activity. At least some known systems use machine learning models to identify anomalous transaction activity. However, providing raw inputs to such machine learning models without normalization may impair model performance.

Accordingly, it would be desirable to have a method for detecting potential financial institution failure with a minimum of false positives and being able to handle increased transaction volume during busy times.

BRIEF DESCRIPTION

In one aspect, a message tracking computing device for identifying anomalous activity in real-time is provided. The message tracking computing device includes at least one processor in communication with at least one memory. The at least one processor is programmed to receive, from a payment processing network, real-time transaction data including a plurality of transaction records. Each transaction record is associated with a payment transaction conducted over the payment processing network. The at least one processor is also programmed to sort the plurality of transaction records into a plurality of channels. Each channel of the plurality of channels represents a different type of transaction. For each channel, the at least one processor is further programmed to compute a normalized velocity score by: computing a streaming mean for a subset of transaction records associated with the corresponding channel, computing a streaming standard deviation for the subset of transaction records, and computing the normalized velocity score based on the streaming mean, the streaming standard deviation, and a transaction ratio for the subset of transaction records. In addition, the at least one processor is programmed to analyze the computed normalized velocity score for each channel to detect anomalous activity. Moreover, the at least one processor is programmed to automatically generate an alert message identifying the anomalous activity. Furthermore, the at least one processor is programmed to transmit the alert message to a remote computing device.

In another aspect, a method for identifying anomalous activity in real-time using a message tracking computing device communicatively coupled to a payment processing network is provided. The method includes receiving, at the message tracking computing device, from the payment processing network, real-time transaction data including a plurality of transaction records. Each transaction record is associated with a payment transaction conducted over the payment processing network. The method also includes sorting the plurality of transaction records into a plurality of channels. Each channel of the plurality of channels represents a different type of transaction. For each channel, the method includes computing, using the message tracking computing device, a normalized velocity score by: computing a streaming mean for a subset of transaction records, computing a streaming standard deviation for the subset of transaction records, and computing the normalized velocity score based on the streaming mean, the streaming standard deviation, and a transaction ratio for the subset of transaction records. The method further includes analyzing, using the message tracking computing device, the computed normalized velocity score for each channel to detect anomalous activity. In addition, the method includes automatically generating, using the message tracking computing device, an alert message identifying the anomalous activity. Moreover, the method includes transmitting, using the message tracking computing device, the alert message to a remote computing device.

In a further aspect, a computer-readable storage medium having computer-executable instructions embodied thereon is provided. When executed by a message tracking computing device including at least one processor in communication with a memory, the computer-readable instructions cause the message tracking computing device to receive, from a payment processing network, real-time transaction data including a plurality of transaction records. Each transaction record is associated with a payment transaction conducted over the payment processing network. The computer-readable instructions also cause the message tracking computing device to sort the plurality of transaction records into a plurality of channels. Each channel of the plurality of channels represents a different type of transaction. For each channel, the computer-readable instructions further cause the message tracking computing device to compute a normalized velocity score by: computing a streaming mean for subset of transaction records associated with the corresponding channel, computing a streaming standard deviation for the subset of transaction records, and computing the normalized velocity score based on the streaming mean, the streaming standard deviation, and a transaction ratio for the subset of transaction records. In addition, the computer-readable instructions cause the message tracking computing device to analyze the computed normalized velocity score for each channel to detect anomalous activity. Moreover, the computer-readable instructions cause the message tracking computing device to automatically generate an alert message identifying the anomalous activity. Furthermore, the computer-readable instructions cause the message tracking computing device to transmit the alert message to a remote computing device.

BRIEF DESCRIPTION OF THE DRAWINGS

FIG. 1 is a schematic diagram illustrating an example multi-party payment card system for enabling payment-by-card transactions and tracking messages in accordance with one embodiment of the present disclosure.

FIG. 2 is a block diagram for an example process for building a model for detecting anomalous activity from historical data, such as provided by the system shown in FIG. 1.

FIG. 3 is a block diagram for an example process for analyzing real-time messages for anomalous activity, such as provided by the system shown in FIG. 1.

FIG. 4 is an expanded block diagram of an example embodiment of a computer system used in processing payment transactions that includes a message tracking computing device in accordance with one example embodiment of the present disclosure.

FIG. 5 illustrates an example configuration of a server system such as the message tracking computing device of FIG. 4.

FIG. 6 illustrates an example configuration of a client system shown in FIG. 4.

FIG. 7 is a flow diagram of an example method for identifying anomalous activity in real-time using the message tracking computing device of FIG. 4.

Figure 1:
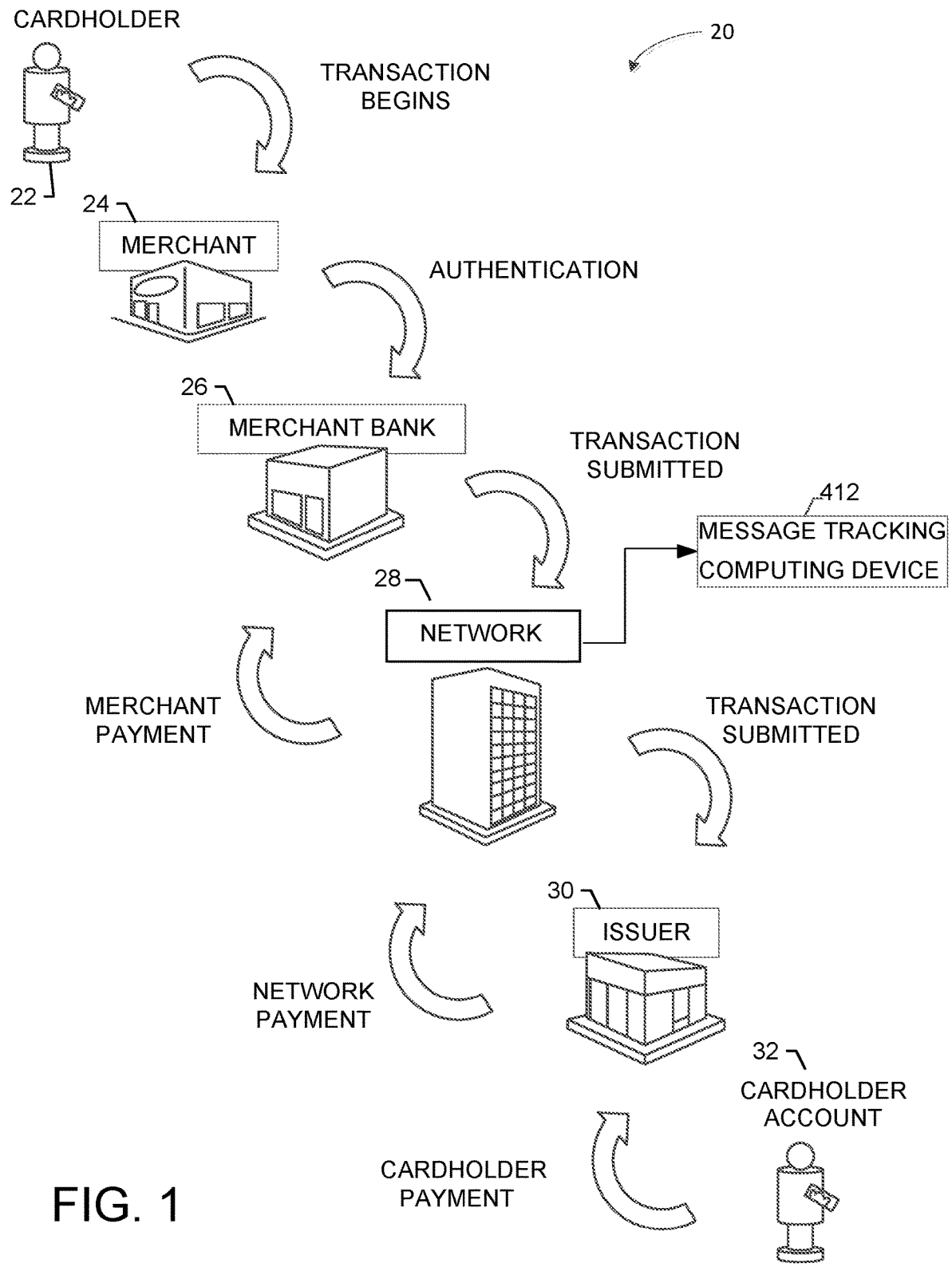
FIGS. 1-7 show example embodiments of the methods and systems described herein.

Although specific features of various embodiments may be shown in some drawings and not in others, this is for convenience only. Any feature of any drawing may be referenced and/or claimed in combination with any feature of any other drawing.

DETAILED DESCRIPTION

The systems and methods described herein are directed to monitoring transaction messages to detect anomalous activity in real-time. In an example embodiment, a message tracking computing device receives real-time transaction data including a plurality of transaction records, wherein each transaction record associated with a payment transaction. The message tracking computer device sorts the plurality of transaction records into a plurality of channels, each channel of the plurality of channels represents a different type of transaction. For each channel, the message tracking computing device computes a normalized velocity score by computing a streaming mean, computing a streaming standard deviation, and computing the normalized velocity score based on the streaming mean, the streaming standard deviation, and a transaction ratio. The message tracking computing device also analyzes the computed normalized velocity score for each channel to detect anomalous activity, and automatically generates and transmits an alert message.

The alert message may include, for example, an identification of the one or more transactions that triggered the generation of the alert message, and the normalized velocity scores for the one or more transactions. Further, parties receiving the alert message may take appropriate steps to address and/or remedy the anomalous activity. For example, if a bank is suspected to be the target of a bank run, the network may apply throttle limits to cards associated with the bank. In a further example, if an issuer computing device receives an alert message indicating that a targeted attack is being carried out on a range of accounts, the issuing bank associated with issuer computing device may freeze all transactions for the range of accounts. In another example, all accounts in that range of accounts may be flagged or otherwise marked as potentially compromised. Subsequently, when any transaction is initiated for a potentially compromised account, a step-up challenge question may be transmitted to the initiator of that transaction to authenticate the initiator before completing the transaction. Those of skill in the art will appreciate that other authentication procedures are also within the spirit and scope of the disclosure. In some other embodiments, the alert may instruct one or more additional computer devices to assist in monitoring the financial institution to provide more computing power to the monitoring and analysis. In these embodiments, the alert may also instruct the one or more computing devices to begin to monitor other, related financial institutions.

To facilitate anomalous event detection, a financial transaction party (e.g., an issuer bank, or issuer) may track message velocities (e.g., the number of transactions conducted during a predetermined period of time) for a particular cardholder's account and/or a range of accounts by tracking messages (e.g., ISO 8583, authorization request and response messages). For example, the issuer may track a number of transactions conducted for a range of accounts (e.g., all accounts associated with a particular issuer) to identify anomalous transaction activity, which may be indicative of fraud or other scenarios (e.g., bank runs, technology failures, etc.).

The embodiments described herein leverage a series of velocities and stratified random sampling to compute means and standard deviations of any arbitrary dimension or combination of dimensions in real-time using the message tracking computing device. This enables computing, for each transaction, a normalized velocity score in real-time that represents how normal or unusual (e.g., anomalous) a given velocity value is at this point in time. The normalized velocity scores provide a dynamic approach to evaluating whether a velocity is unusual, which is very important in detecting fraud, bank runs, large-scale attacks, etc. Using normalized velocities may account for differences between banks, such as volume, to standardize the analysis. Furthermore, normalized velocities may increase accuracy by relying on relative features, rather than absolute values.

To compute normalized velocity scores, the message tracking computing device receives real-time transaction data from a payment processing network. The real-time transaction data includes transaction records for a plurality of payment transactions conducted over the payment processing network over a predetermined time period (e.g., over the last fifteen minutes, over the last hour, over the last six hours, over the last twenty-four hours, etc.).

For example, the real-time transaction data may include all transaction records for a particular issuing bank over the predetermined time period. In the example embodiment, the message tracking computing device receives the transaction data in real-time (e.g., message tracking computing device receives transactions records for a transaction substantially simultaneously with completion of the transaction over the payment processing network). It is parsed and analyzed by the message tracking computing device to calculate a normalized score for each payment transaction and identify anomalous activity in real-time (e.g., substantially simultaneously with the completion of each payment transaction). Those of skill in the art will appreciate that, as used herein, real-time indicates that the normalized score for a given payment transaction is computed and anomalous activity is identified less than five minutes after completion of the payment transaction, less than one minute after completion of the payment transaction, less than thirty seconds after completion of the payment transaction, less than ten seconds after completion of the payment transaction, or less than five seconds after completion of the payment transaction.

The transaction records in the real-time transaction data each include information associated with the transaction that may be used by the message tracking computing device to compute normalized velocity scores, as described herein. For example, a transaction record for a transaction may specify a transaction type (e.g., card not present transaction, card present transaction, online transaction, merchant point-of-sale transaction, etc.), a transaction location (e.g., a country code, a state code, a city code), a merchant identifier, a transaction time (i.e., a timestamp indicating when the transaction occurred), a product category, an issuing bank identifier, a transaction amount, and a transaction ratio. The transaction ratio represents the underlying parameter for which the mean and standard deviation are being estimated. Alternatively, the transaction records may include any information that enables calculating a normalized velocity score for a transaction, as described herein. In some embodiments, the real-time transaction data includes all of the transactions from an individual issuer. In other embodiments, the real-time transaction data includes a sampling of the transactions from the issuer. In some embodiments, there may be multiple message tracking computing devices, which are assigned different issuers to monitor.

In the example embodiment, the real-time transaction data is sorted into channels. Each channel represents a different type of transaction. For each channel, the message tracking computing device calculates a normalized velocity for the transactions in a channel, such as Channel A and updates the normalized velocity for that channel, where the message tracking computing device tracks a normalized velocity for each channel of the plurality of channels.

The message tracking computing device compares the normalized velocities of all of the channels to a model. If the message tracking computing device detects anomalous activity, the message tracking computing device transmits an alert. In some embodiments, the alert is transmitted to one or more computer devices associated with the issuer or the network. In other embodiments, the message tracking computing device transmits the alert to any computer device that the user designates, such as in user preferences.

To generate the model, the message tracking computing device receives historical transaction data. The historical transaction data includes data from a plurality of channels. In the exemplary embodiment, the channels include, but are not limited to, ATM activity, card not present transactions, point-of-sale transactions, quasi transactions (cash back transactions), cross-border transactions, approved transactions, and declined transactions. The historical transaction data includes information about the accounts associated with the transactions and the amount of the transaction. In the exemplary embodiment, the historical transaction data is associated with an anomalous event, such as a bank run or financial institution failure. In some embodiments, the historical transactions data includes transactions for a predetermined period of time before the anomalous event, during the event, and for a predetermined period after the event. In some further embodiments, the historical transaction data includes transactions from multiple occurrences of the event, potentially at multiple different financial institutions. For the purposes of this discussion, the financial institution represents an issuer bank. In the exemplary embodiment, the time frame of the transactions for all of the transactions in all of the channels is the same.

In the exemplary embodiment, the message tracking computing device sorts the historical transaction data into channels. For the purposes of this discussion three channels are illustrated, Channel A, Channel B, and Channel C. One having skill in the art would understand that more channels are available and the message tracking computing device may sort the historical transaction data into as many channels as are practical or necessary.

For each channel, the message tracking computing device calculates a normalized velocity for that channel. In at least one embodiment, normalized velocities may be calculated as described in FIG. 3. The message tracking computing device combines the normalized velocities for the different channels to generate the model.

In some embodiments, the model is trained multiple times, where each training proceeds through process for a different set of historical transaction data associated with a different occurrence of the anomalous event. In some embodiments, the model is trained to recognize more than one type of anomalous event.

For example, one indicator that a financial institution is about to fail is a bank run, where multiple people act to remove their money from the financial institution or bank. For this example, the bank run may be detected by a significant increase in ATM transactions. However, just checking on an upswing in ATM transactions will create a lot of false positives, such as during holidays, the first and last day of the week, and the first and last day of the month. Furthermore, setting a threshold line for the whole network does not take into account variations from different regions, issuers, countries, etc. Therefore, the system described herein generates a model that includes multiple channels, and normalized velocities.

In this example, ATM transactions are assigned to Channel A, while sources of transactions, such as, but not limited to, card-not-present transactions, point-of-sale transactions, quasi transactions (cash back transactions), cross-border transactions, approved transactions, and declined transactions, are each assigned to their own individual channel (a/k/a Channels B-G).

In this example, the normalized velocity for each Channel (A-G) is calculated based on the transactions over time in the historical transaction data. Then the normalized velocities are combined to generate the model. In this example, the normalized velocities and the weights in the model illustrate that there is a significant increase in the ATM transactions, while the transactions in the other channels remain normal for the time period prior to and during the bank run. Therefore, the model analyzes the incoming real-time transactions to recognize when a significant upswing in ATM transactions occurs while the transactions in the other channels remain normal.

Accordingly, as described above, a normalized velocity score is computed by the message tracking computing device for each transaction record in the real-time transaction data. In the example embodiment, the message tracking computing device also automatically analyzes the computed normalized velocity scores to identify fraudulent or otherwise anomalous activity (e.g., a targeted attack on the account range associated with the transaction dataset).

For example, in some embodiments, the message tracking computing device may compare the normalized velocity scores to a threshold score, compare the normalized velocity scores to historical normalized velocity scores, and/or apply one or more machine learning algorithms to the normalized velocity scores to identify patterns and identify anomalous activity, as described above. Those of skill in the art will appreciate that other techniques of identifying anomalous activity not explicitly mentioned herein fall within the spirit of scope of the disclosure.

When the message tracking computing device identifies anomalous activity, in the example embodiment, the message tracking computing device automatically generates and transmits an alert message to a remote computing device. For example, the message tracking computing device may transmit an alert to a merchant computing device, an acquirer computing device, an issuer computing device, and/or a cardholder computing device.

The alert message may include, for example, an identification of the one or more transactions that triggered the generation of the alert message, and the normalized velocity scores for the one or more transactions. Further, parties receiving the alert message may take appropriate steps to address and/or remedy the anomalous activity. For example, if a bank is suspected to be the target of a bank run, the network may apply throttle limits to cards associated with the bank. In a further example, if an issuer computing device receives an alert message indicating that a targeted attack is being carried out on a range of accounts, the issuing bank associated with issuer computing device may freeze all transactions for the range of accounts. In another example, all accounts in that range of accounts may be flagged or otherwise marked as potentially compromised. Subsequently, when any transaction is initiated for a potentially compromised account, a step-up challenge question may be transmitted to the initiator of that transaction to authenticate the initiator before completing the transaction. Those of skill in the art will appreciate that other authentication procedures are also within the spirit and scope of the disclosure. In some other embodiments, the alert may instruct one or more additional computer devices to assist in monitoring the financial institution to provide more computing power to the monitoring and analysis. In these embodiments, the alert may also instruct the one or more computing devices to begin to monitor other, related financial institutions.

The methods and system described herein may be implemented using computer programming or engineering techniques including computer software, firmware, hardware, or any combination or subset. As disclosed above, at least one technical problem with prior systems is that there is a need for systems for a cost-effective and efficient manner for monitoring message traffic for anomalous events. The system and methods described herein address that technical problem. Additionally, at least one of the technical solutions provided by this system to overcome technical problems may include: (i) improved speed in recognizing anomalous activity; (ii) reduced false positives in recognizing anomalous activity; (iii) reduced processing required for monitoring real-time data; and (iv) ability to analyze a wide variety of parameters and dimensions.

The methods and systems described herein may be implemented using computer programming or engineering techniques including computer software, firmware, hardware, or any combination or subset thereof, wherein the technical effects may be achieved by performing at least one of the following steps: a) receive, from a payment processing network, real-time transaction data including a plurality of transaction records, each transaction record associated with a payment transaction conducted over the payment processing network; b) sort the plurality of transaction records into a plurality of channels, wherein each channel of the plurality of channels represents a different type of transaction, wherein the plurality of channels includes one or more of ATM transactions, card not present transactions, point-of-sale transactions, quasi transactions, cross-border transactions, approved transactions, and declined transactions; c) for each channel, compute a normalized velocity score by: 1) computing a streaming mean for a subset of transaction records associated with the corresponding channel; 2) computing a streaming standard deviation for the subset of transaction records; and 3) computing the normalized velocity score based on the streaming mean, the streaming standard deviation, and a transaction ratio for the subset of transaction records; d) analyze the computed normalized velocity score for each channel to detect anomalous activity; e) automatically generate an alert message identifying the anomalous activity; f) transmit the alert message to a remote computing device; g) compute a time difference between a first time associated with the transaction record and a second time associated with the most recent transaction record in the real-time transaction data before the transaction record; h) compute a velocity decay parameter based on the time difference; i) compute the streaming mean based on the velocity decay parameter; j) compute a mean transaction ratio from the transaction ratios for all the transaction record in the real-time transaction data; k) compute a transaction ratio standard deviation from the transaction ratios for all the transaction record in the real-time transaction data; l) compute a population velocity score for the subset of transaction records based on the mean transaction ratio and the transaction ratio standard deviation; m) transmit the alert message to at least one of a merchant computing device, an acquirer computing device, an issuer computing device, and a cardholder computing device; n) analyze the computed normalized velocity score for each channel within thirty seconds of receipt of the real-time transaction data from the payment processing network; o) compare the normalized velocity score for each channel to a model of anomalous activity, wherein the model includes a plurality of weights associated with the normalized velocity scores for each channel of the plurality of channels; p) receive a plurality of historical transaction data including a plurality of transaction records associated with an anomalous activity; q) sort the plurality of historical transaction data into the plurality of channels; r) calculate a normalized velocity score for each channel; and s) generate the model based on the plurality of normalized vector scores.

As will be appreciated, based on the description herein the technical improvement in velocity tracking systems as described herein is a computer-based solution to a technical deficiency or problem that is itself rooted in computer technology (e.g., the problem itself derives from the use of computer technology). More specifically, fraud and other anomalous activity is a significant problem for transactions conducted over an electronic payment network, especially for card-not-present transactions. At least some known methods and systems for detecting anomalous activity require relatively large computational resources and fail to accurately detect anomalous activity in at least some circumstances. Accordingly, to address these problem, the systems and methods described herein compute normalized velocity scores in real-time, and analyze the computed normalized velocity scores to identify anomalous activity in real-time.

The following detailed description of the embodiments of the disclosure refers to the accompanying drawings. The same reference numbers in different drawings may identify the same or similar elements. Also, the following detailed description does not limit the claims.

Described herein are computer systems such as message tracking computing devices. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "payment device," "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), wearable computing devices, key fobs, and/or any other computing devices capable of providing account information. Moreover, these terms may refer to payments made directly from or using bank accounts, stored valued accounts, mobile wallets, etc., and accordingly are not limited to physical devices but rather refer generally to payment credentials. Each type of payment device can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to tracking velocities for transactions.

FIG. 1 is a schematic diagram illustrating an example multi-party payment card system 20 for facilitating transactions and tracking messages (e.g., tracking transaction velocity) for those transactions, in accordance with one embodiment of the present disclosure. FIG. 1 depicts a flow of data in a typical financial transaction through system 20, which includes a message tracking computing device 412.

Components of system 20 provide message tracking computing device 412 with transaction data, which message tracking computing device 412 processes as described herein.

Embodiments described herein may relate to a transaction card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. Cardholder 22 may purchase goods and services ("products") at merchant 24. Cardholder 22 may make such purchases using virtual forms of the transaction card and, more specifically, by providing data related to the transaction card (e.g., the transaction card number, expiration date, associated postal code, and security code) to initiate transactions. To accept payment with the transaction card or virtual forms of the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card or virtual transaction card, merchant 24 requests authorization from a merchant bank 26 for the amount of the purchase. The request may be performed over the telephone or electronically, but is usually performed through the use of a point-of-sale terminal, which reads cardholder's 22 account information from a magnetic stripe, a chip, or embossed characters on the transaction card and communicates electronically with the transaction processing computers of merchant bank 26. Merchant 24 receives cardholder's 22 account information as provided by cardholder 22. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as Mastercard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns products after the transaction has been captured, a "credit" is generated. Interchange network 28 and/or issuer bank 30 stores the transaction card information, such as a type of merchant, amount of purchase, date of purchase, in a database 420 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. In the example embodiment, transaction data including such additional transaction data may also be provided to systems including message tracking computing device 412. In the example embodiment, interchange network 28 provides such transaction data (including merchant data associated with merchant tenants of each commercial real estate asset of each portfolio record) and additional transaction data. In alternative embodiments, any party may provide such data to message tracking computing device 412.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described below in more detail, message tracking computing device 412 may be used to implement a message tracking scheme to track, for example, transaction velocities. Although the systems described herein are not intended to be limited to facilitate such applications, the systems are described as such as an example.

Figure 2:
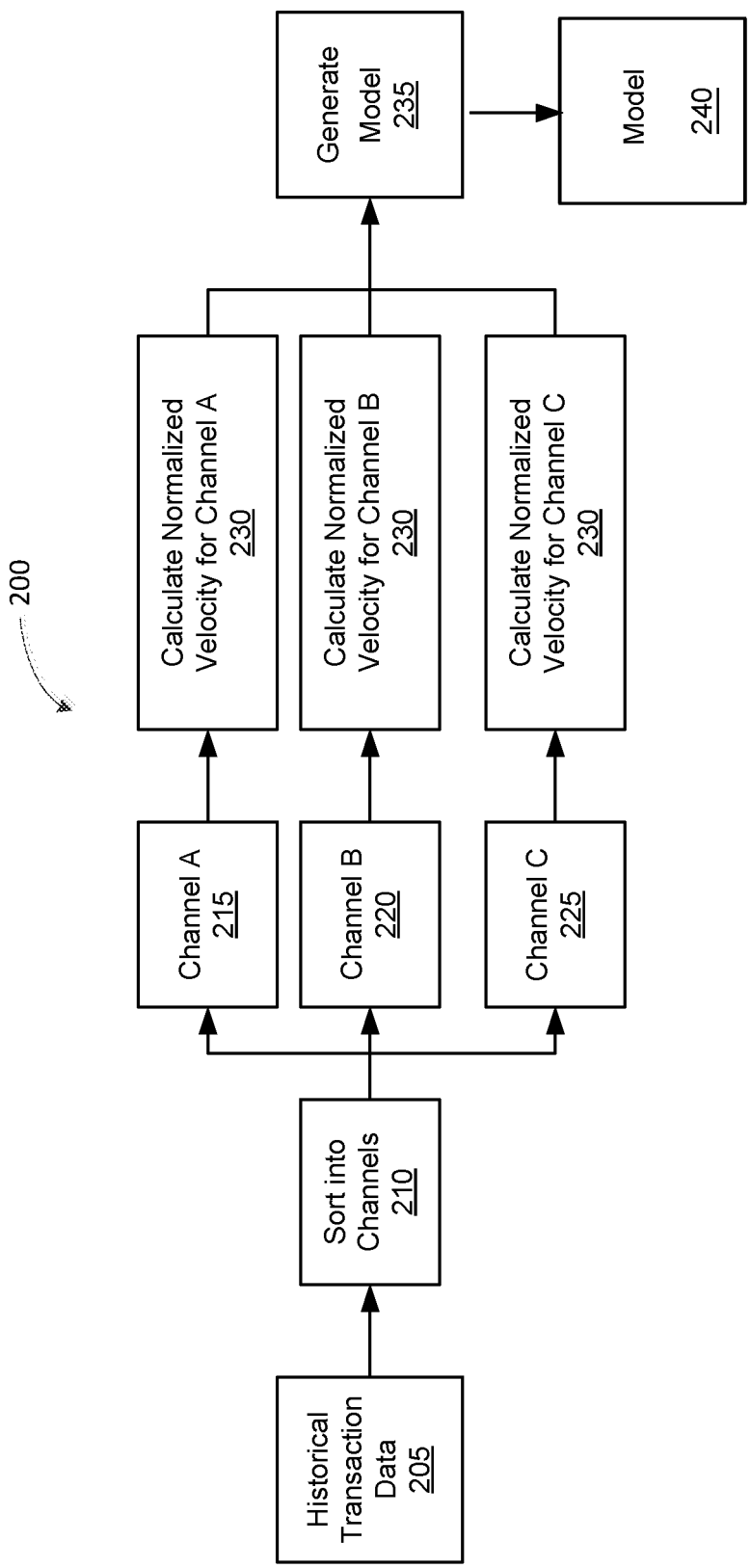

FIG. 2 is a block diagram for an example process 200 for building a model 240 for detecting anomalous activity from historical data, such as provided by the system 20 (shown in FIG. 1). In the exemplary embodiment, process 200 is performed by message tracking computing device 412 (shown in FIG. 4). In other embodiments, process 200 is performed by a separate computer device and the model 240 is provided to or accessed by message tracking computing device 412.

In the exemplary embodiment, the message tracking computing device 412 receives historical transaction data 205. The historical transaction data 205 includes data from a plurality of channels. In the exemplary embodiment, the channels include, but are not limited to, ATM activity, card not present transactions, point-of-sale transactions, quasi transactions (cash back transactions), cross-border transactions, approved transactions, and declined transactions. The historical transaction data 205 includes information about the accounts associated with the transactions and the amount of the transaction. In the exemplary embodiment, the historical transaction data 205 is associated with an anomalous event, such as a bank run or financial institution failure. In some embodiments, the historical transactions data 205 includes transactions for a predetermined period of time before the anomalous event, during the event, and for a predetermined period after the event. In some further embodiments, the historical transaction data 205 includes transactions from multiple occurrences of the event, potentially at multiple different financial institutions. For the purposes of this discussion, the financial institution represents an issuer bank 30 (shown in FIG. 1). In the exemplary embodiment, the time frame of the transactions for all of the transactions in all of the channels is the same.

In the exemplary embodiment, the message tracking computing device 412 sorts 210 the historical transaction data 205 into channels. For the purposes of this discussion three channels are illustrated, Channel A 215, Channel B 220, and Channel C 225. One having skill in the art would understand that more channels are available and the message tracking computing device 412 may sort 210 the historical transaction data 205 into as many channels as are practical or necessary.

For each channel 215-225, the message tracking computing device 412 calculates 230 a normalized velocity for that channel 215-225. In at least one embodiment, normalized velocities may be calculated as described in FIG. 3. The message tracking computing device 412 combines the normalized velocities for the different channels 215-225 to generate 235 the model 240.

In some embodiments, the model 240 is trained multiple times, where each training proceeds through process 200 for a different set of historical transaction data 205 associated with a different occurrence of the anomalous event. In some embodiments, the model 240 is trained to recognize more than one type of anomalous event.

Figure 3:
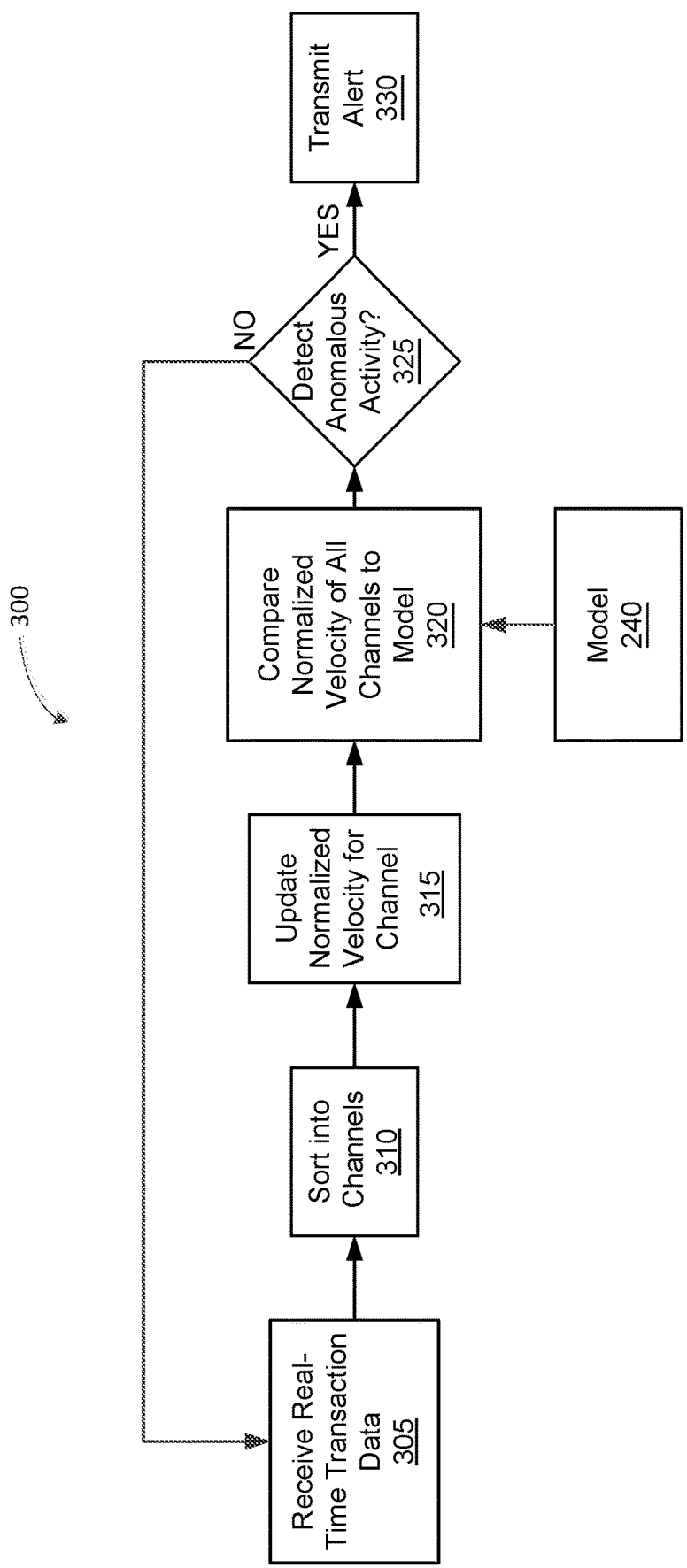

FIG. 3 is a block diagram for an example process 300 for analyzing real-time messages for anomalous activity, such as provided by the system 20 (shown in FIG. 1). In the exemplary embodiment, process 300 is performed by the message tracking computing device 412 (shown in FIG. 4). In some embodiments, the steps of process 300 are performed by various different computer devices, who are in communication with each other.

To facilitate anomalous event detection, a financial transaction party (e.g., an issuer bank, or issuer) may track message velocities (i.e., the number of transactions conducted during a predetermined period of time) for a particular cardholder's account and/or a range of accounts by tracking messages (e.g., authorization request and response messages). For example, the issuer may track a number of transactions conducted for a range of accounts (e.g., all accounts associated with a particular issuer) to identify anomalous transaction activity, which may be indicative of fraud or other scenarios (e.g., bank runs, technology failures, etc.).

The embodiments described herein leverage a series of velocities and stratified random sampling to compute means and standard deviations of any arbitrary dimension or combination of dimensions in real-time using message tracking computing device 412. This enables computing, for each transaction, a normalized velocity score in real-time that represents how normal or unusual (i.e., anomalous) a given velocity value is at this point in time. The normalized velocity scores provide a dynamic approach to evaluating whether a velocity is unusual, which is very important in detecting fraud, bank runs, large-scale attacks, etc.

To compute normalized velocity scores, message tracking computing device 412 receives real-time transaction data 305 from a payment processing network (e.g., interchange network 28 shown in FIG. 1). The real-time transaction data 305 includes transaction records for a plurality of payment transactions conducted over the payment processing network over a predetermined time period (e.g., over the last fifteen minutes, over the last hour, over the last six hours, over the last twenty-four hours, etc.).

For example, the real-time transaction data 305 may include all transaction records for a particular issuing bank over the predetermined time period. In the example embodiment, message tracking computing device 412 receives transaction data 305 in real-time (e.g., message tracking computing device 412 receives transactions records for a transaction substantially simultaneously with completion of the transaction over the payment processing network). parsed and analyzed by message tracking computing device 412 to calculate a normalized score for each payment transaction and identify anomalous activity in real-time (e.g., substantially simultaneously with the completion of each payment transaction). Those of skill in the art will appreciate that, as used herein, real-time indicates that the normalized score for a given payment transaction is computed and anomalous activity is identified less than five minutes after completion of the payment transaction, less than one minute after completion of the payment transaction, less than thirty seconds after completion of the payment transaction, less than ten seconds after completion of the payment transaction, or less than five seconds after completion of the payment transaction.

The transaction records in the real-time transaction data 305 each include information associated with the transaction that may be used by message tracking computing device 412 to compute normalized velocity scores, as described herein. For example, a transaction record for a transaction may specify a transaction type (e.g., card not present transaction, card present transaction, online transaction, merchant point-of-sale transaction, etc.), a transaction location (e.g., a country code, a state code, a city code), a merchant identifier, a transaction time (i.e., a timestamp indicating when the transaction occurred), a product category, an issuing bank identifier, a transaction amount, and a transaction ratio. The transaction ratio represents the underlying parameter for which the mean and standard deviation are being estimated. Alternatively, the transaction records may include any information that enables calculating a normalized velocity score for a transaction, as described herein. In some embodiments, the real-time transaction data 305 includes all of the transactions from an individual issuer. In other embodiments, the real-time transaction data 305 includes a sampling of the transactions from the issuer. In some embodiments, multiple message tracking computing devices 412 are assigned different issuers to monitor.

In the example embodiment, the real-time transaction data 305 is sorted 310 into channels, such as Channels 215-225 (shown in FIG. 2). For each channel 215-225, the message tracking computing device 412 calculates a normalized velocity for the transactions in a channel, such as Channel A 215 and updates 315 the normalized velocity for that channel 215-225, where the message tracking computing device 412 tracks a normalized velocity for each channel of the plurality of channels.

The message tracking computing device 412 compares 320 the normalized velocities of all of the channels 215-225 to the model 240. If the message tracking computing device 412 detects 325 anomalous activity, the message tracking computing device 412 transmits 330 an alert. In some embodiments, the alert is transmitted 330 to one or more computer devices associated with the issuer 30 or the network 28. In other embodiments, the message tracking computing device 412 transmits 330 the alert to any computer device that the user designates, such as in user preferences.

For example, one indicator that a financial institution is about to fail is a bank run, where multiple people act to remove their money from the financial institution or bank. For this example, the bank run may be detected by a significant increase in ATM transactions. However, just checking on an upswing in ATM transactions will create a lot of false positives, such as during holidays, the first and last day of the week, and the first and last day of the month. Furthermore, setting a threshold line for the whole network does not take into account variations from different regions, issuers, countries, etc. Therefore, the system described herein generates a model that includes multiple channels, and normalized velocities.

In this example, ATM transactions are assigned to Channel A 215, while sources of transactions, such as, but not limited to, card not present transactions, point-of-sale transactions, quasi transactions (cash back transactions), cross-border transactions, approved transactions, and declined transactions, are each assigned to their own individual channel (aka Channels B-G).

In this example, the normalized velocity for each Channel (A-G) is calculated based on the transactions over time in the historical transaction data 205, as shown in Step 230 (shown in FIG. 2). Then the normalized velocities are combined to generate 235 the model 240. In this example, the normalized velocities and the weights in the model 240 illustrate that there is a significant increase in the ATM transactions, while the transactions in the other channels remain normal for the time period prior to and during the bank run. Therefore, the model 240 analyzes the incoming real-time transactions to recognize when a significant upswing in ATM transactions occurs while the transactions in the other channels remain normal.

Accordingly, as described above, a normalized velocity score is computed by message tracking computing device 412 for each transaction record in the real-time transaction data 305. In the example embodiment, message tracking computing device 412 also automatically analyzes the computed normalized velocity scores to identify fraudulent or otherwise anomalous activity (e.g., a targeted attack on the account range associated with the transaction dataset).

For example, in some embodiments, message tracking computing device 412 may compare 320 the normalized velocity scores to a threshold score, compare the normalized velocity scores to historical normalized velocity scores, and/or apply one or more machine learning algorithms to the normalized velocity scores to identify patterns and identify anomalous activity, as described above. Those of skill in the art will appreciate that other techniques of identifying anomalous activity not explicitly mentioned herein fall within the spirit of scope of the disclosure.

When message tracking computing device 412 identifies anomalous activity, in the example embodiment, message tracking computing device 412 automatically generates and transmits an alert message to a remote computing device. For example, message tracking computing device 412 may transmit an alert to a merchant computing device (e.g., associated with merchant 24 shown in FIG. 1), an acquirer computing device (e.g., associated with merchant bank 26 shown in FIG. 1), an issuer computing device (e.g., associated with issuer bank 30 shown in FIG. 1), and/or a cardholder computing device (e.g., associated with cardholder 22 shown in FIG. 1).

The alert message may include, for example, an identification of the one or more transactions that triggered the generation of the alert message, and the normalized velocity scores for the one or more transactions. Further, parties receiving the alert message may take appropriate steps to address and/or remedy the anomalous activity. For example, if a bank is suspected to be the target of a bank run, the network 28 may apply throttle limits to cards associated with the bank. In a further example, if an issuer computing device receives an alert message indicating that a targeted attack is being carried out on a range of accounts, the issuing bank associated with issuer computing device may freeze all transactions for the range of accounts. In another example, all accounts in that range of accounts may be flagged or otherwise marked as potentially compromised. Subsequently, when any transaction is initiated for a potentially compromised account, a step-up challenge question may be transmitted to the initiator of that transaction to authenticate the initiator before completing the transaction. Those of skill in the art will appreciate that other authentication procedures are also within the spirit and scope of the disclosure. In some other embodiments, the alert may instruct one or more additional computer devices to assist in monitoring the financial institution to provide more computing power to the monitoring and analysis. In these embodiments, the alert may also instruct the one or more computing device to begin to monitor other, related financial institutions.

In the exemplary embodiment, the normalized velocity score for a given payment transaction of interest is calculated by message tracking computing device 412 as follows in the example embodiment. Initially, a time difference ("time_delta") for the payment transaction of interest is calculated by message tracking computing device 412 as the time elapsed between the time of the payment transaction of interest and the time of the most recent payment transaction in the transaction dataset before the payment transaction.

Next, a velocity decay parameter ("vel_decay") for the payment transaction of interest is calculated by message tracking computing device 412 in the example embodiment. This represents the decay for the parameter of interest over 24 hours. Specifically, the velocity decay parameter is calculated using the following Equation 1:

$$\text{vel\_decay} = e^{-(\ln(2) \ast w \ast \text{time\_delta})} \qquad \text{Equation 1}$$

where ln(2) is the rate of decay, w is a scaling factor, and time_delta is the time difference between the time of the transaction and the end of the time window. In some embodiments, w is set to 1 for one day, and may be a fraction for a fraction or portion of a day.

Using the velocity decay parameter, a mean velocity sum ("mean_vel_sum") for the payment transaction of interest is calculated by message tracking computing device 412. The velocity parameter represents the metric that the message tracking computing device 416 is calculating streaming z for. The velocity parameter is the value that the message tracking computer device 412 is attempting to determine if it is "high" or "low." For example, the message tracking computer device 412 may determine that there is a run on a bank when the bank encounters "high" amounts of ATM traffic, with the rest of the traffic staying in normal ranges for the corresponding channel. Specifically, the mean velocity sum is calculated using the following Equation 2:

$$\text{mean\_vel\_sum} = (\text{prev\_mean\_vel\_sum} \ast \text{vel\_decay}) + \text{transaction\_ratio} \qquad \text{Equation 2}$$

where prev_mean_vel_sum is the mean velocity sum of the most recent transaction prior to the payment transaction of interest (e.g., calculated by message tracking computing device 412).

Further, in the example embodiment, a mean velocity count ("mean_vel_count") is calculated for the payment transaction of interest by message tracking computing device 412. Specifically, the mean velocity count is calculated using the following Equation 3:

$$\text{mean\_vel\_count} = (\text{prev\_mean\_vel\_count} * \text{vel\_decay}) + \text{txn\_count} \quad \text{Equation 3}$$

where prev_mean_vel_count is the mean velocity count of the most recent transaction prior to the payment transaction of interest, and txn_count is the number of transactions included in the payment transaction of interest (e.g., 1).

Subsequently, a streaming mean ("ratio_mean") for the particular payment transaction is calculated by message tracking computing device 412 using the following Equation 4:

$$\text{ratio\_mean} = \text{mean\_vel\_sum} / \text{mean\_vel\_count} \quad \text{Equation 4}$$

From the streaming mean, message tracking computing device 412 calculates a variance component ("var_comp") for the particular payment transaction using the following Equation 5:

$$\text{var\_comp} = (\text{transaction\_ratio} - \text{ratio\_mean})^2 \quad \text{Equation 5}$$

Further, in the example embodiment, a variance component sum ("var_comp_sum") for the particular payment is transaction is calculated by message tracking computing device 412. Specifically, the variance component sum is calculated using the following Equation 6:

$$\text{var\_comp\_sum} = (\text{prev\_var\_comp\_sum} * \text{vel\_decay}) + \text{var\_comp} \quad \text{Equation 6}$$

where var_comp_sum is the variance component sum of the most recent transaction prior to the payment transaction of interest.

In the example embodiment, a streaming standard deviation ("stream_std_dev") is calculated by message tracking computing device 412. Specifically, the streaming standard deviation is calculated using the following Equation 7:

$$\text{stream\_std\_dev} = \sqrt{\frac{\text{var\_comp\_sum}}{\text{mean\_vel\_count}}} \quad \text{Equation 7}$$

Then, the normalized velocity score ("norm_vel_score") for the payment transaction of interest is calculated by message tracking computing device 412 based on the streaming standard deviation and the streaming mean. Specifically, message tracking computing device 412 computes the normalized velocity score using the following Equation 8:

$$\text{norm\_vel\_score} = \frac{(\text{transaction\_ratio} - \text{ratio\_mean})}{\text{stream\_std\_dev}} \quad \text{Equation 8}$$

In some embodiments, a population velocity score ("population_score") is also computed for each payment transaction by message tracking computing device 412. The population velocity score is computed based on a mean and standard deviation of the transaction ratio for the transaction dataset. Specifically, a mean transaction ratio ("mean_pop") is calculated from the transaction ratios for all the transaction records in the transaction data set, and a transaction ratio standard deviation ("std_dev_pop") is calculated from the transaction ratios for all the transaction records in the transaction data set. Then, message tracking computing device 412 computes the population velocity score using the following Equation 9:

$$\text{population\_score} = \frac{(\text{transaction\_ratio} - \text{mean\_pop})}{\text{std\_dev\_pop}} \quad \text{Equation 9}$$

The message tracking computer device 412 maps the z-score into a probability based on a Gaussian normal distribution of the underlying metric. Therefore, given a z-score, the message tracking computer device 412 may determine how rare that z-score is. If the z-score is extremely rare, such as the case of detecting a run on a bank, then the message tracking computer device 412 would transmit an alert based on it.

Figure 4:
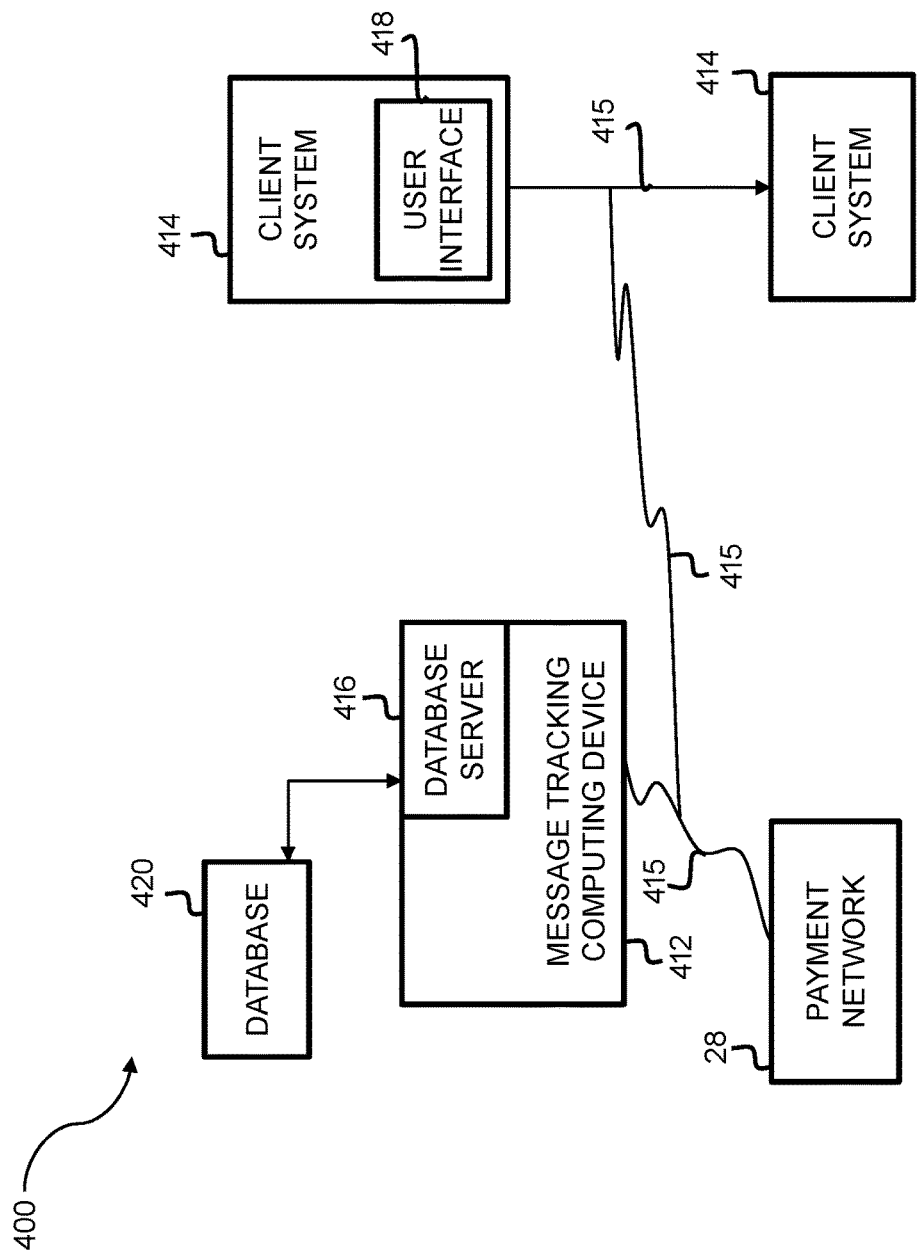

FIG. 4 is an expanded block diagram of an example embodiment of a computer system 400 used in processing payment transactions that includes a message tracking computing device 412 in accordance with one example embodiment of the present disclosure. In the example embodiment, system 400 is used for tracking transaction velocities, as described herein.

More specifically, in the example embodiment, system 400 includes message tracking computing device 412, and a plurality of client sub-systems, also referred to as client systems 414, connected to message tracking computing device 412. In one embodiment, client systems 414 are computers including a web browser, such that message tracking computing device 412 is accessible to client systems 414 using the Internet and/or using network 415. Client systems 414 are interconnected to the Internet through many interfaces including a network 415, such as a local area network (LAN) or a wide area network (WAN), dial-in-connections, cable modems, special high-speed Integrated Services Digital Network (ISDN) lines, and RDT networks. Client systems 414 may include systems associated with cardholders 22 (shown in FIG. 1) as well as external systems used to store data. Message tracking computing device 412 is also in communication with payment network 28 using network 415. Further, client systems 414 may additionally communicate with payment network 28 using network 415. Client systems 414 could be any device capable of interconnecting to the Internet including a web-based phone, PDA, or other web-based connectable equipment.

A database server 416 is connected to database 420, which contains information on a variety of matters, as described below in greater detail. In one embodiment, centralized database 420 is stored on message tracking computing device 412 and can be accessed by potential users at one of client systems 414 by logging onto message tracking computing device 412 through one of client systems 414. In an alternative embodiment, database 420 is stored remotely from message tracking computing device 412 and may be non-centralized. Database 420 may be a database configured to store information used by message tracking computing device 412 including, for example, transaction records, as described herein.

Database 420 may include a single database having separated sections or partitions, or may include multiple databases, each being separate from each other. Database 420 may store transaction data generated over the processing network including data relating to merchants, consumers, account holders, prospective customers, issuers, acquirers, and/or purchases made. Database 420 may also store account data including at least one of a cardholder name, a cardholder address, an account number, other account identifiers, and transaction information. Database 420 may also store merchant information including a merchant identifier that identifies each merchant registered to use the network, and instructions for settling transactions including merchant bank account information. Database 420 may also store purchase data associated with items being purchased by a cardholder from a merchant, and authorization request data.

In the example embodiment, one of client systems 414 may be associated with one of acquirer bank 26 (shown in FIG. 1) and issuer bank 30 (also shown in FIG. 1). For example, one of client systems 414 may be a POS device. Client systems 414 may additionally or alternatively be associated with a user (e.g., a commercial real estate owner or lender, a marketing director, a consumer, or any other end user). In the example embodiment, one of client systems 414 includes a user interface 418. For example, user interface 418 may include a graphical user interface with interactive functionality, such that message tracking results, transmitted from message tracking computing device 412 to client system 414, may be shown in a graphical format. A user of client system 414 may interact with user interface 418 to view, explore, and otherwise interact with the message tracking results. A user may also operate user interface 418 to define a scheme for identifying anomalous activity, as described herein. Message tracking computing device 412 may be associated with interchange network 28 and/or may process transaction data.

Figure 5:
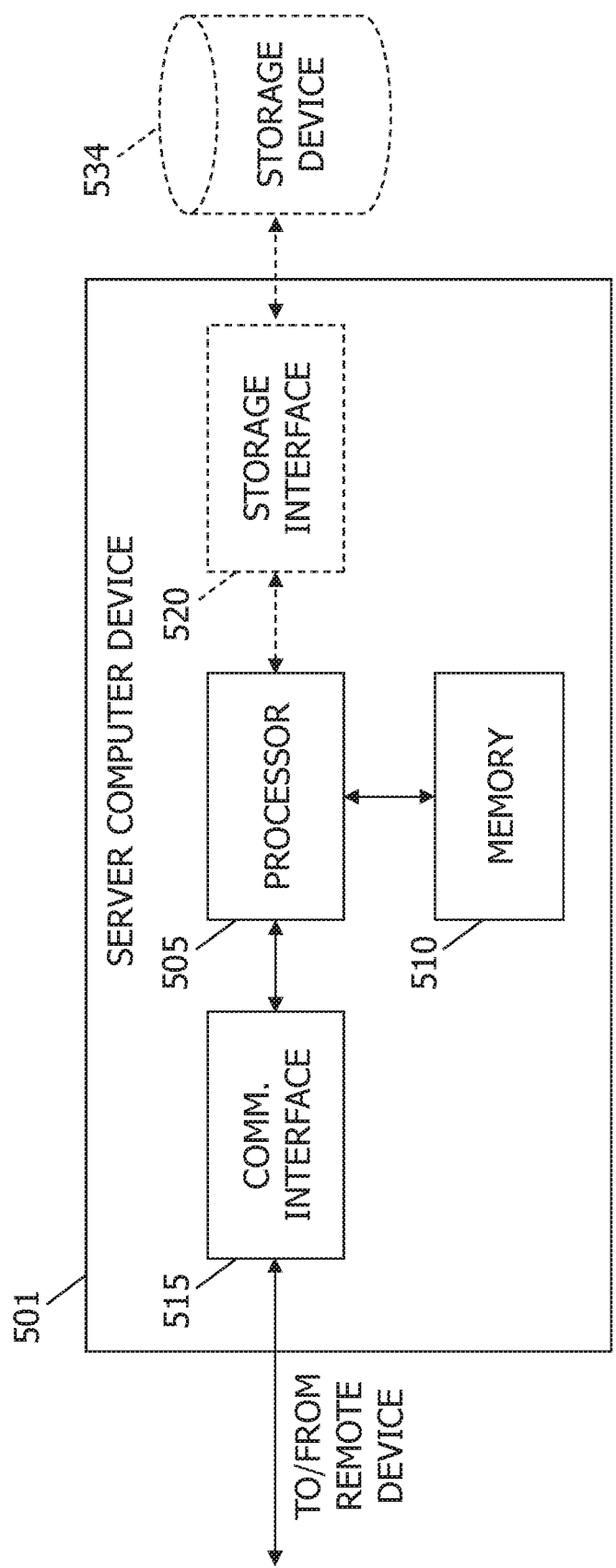

FIG. 5 illustrates an example configuration of a server system 501 such as message tracking computing device 412 (shown in FIGS. 1 and 4), in accordance with one example embodiment of the present disclosure. Server system 501 may also include, but is not limited to, message tracking computing device 412, payment network 28, and database server 416 (all shown in FIG. 4). In the example embodiment, server system 501 computes and analyzes normalized velocity scores to identify anomalous activity, as described below.

Server system 501 includes a processor 505 for executing instructions. Instructions may be stored in a memory area 510, for example. Processor 505 may include one or more processing units (e.g., in a multi-core configuration) for executing instructions. The instructions may be executed within a variety of different operating systems on the server system 501, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 505 is operatively coupled to a communication interface 515 such that server system 501 is capable of communicating with a remote device such as a user system or another server system 501. For example, communication interface 515 may receive requests from a client system 414 via the Internet, as illustrated in FIG. 2.

Processor 505 may also be operatively coupled to a storage device 534. Storage device 534 is any computer-operated hardware suitable for storing and/or retrieving data. In some embodiments, storage device 534 is integrated in server system 501. For example, server system 501 may include one or more hard disk drives as storage device 534. In other embodiments, storage device 534 is external to server system 501 and may be accessed by a plurality of server systems 501. For example, storage device 534 may include multiple storage units such as hard disks or solid state disks in a redundant array of inexpensive disks (RAID) configuration. Storage device 534 may include a storage area network (SAN) and/or a network attached storage (NAS) system.

In some embodiments, processor 505 is operatively coupled to storage device 534 via a storage interface 520. Storage interface 520 is any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Memory area 510 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 6:
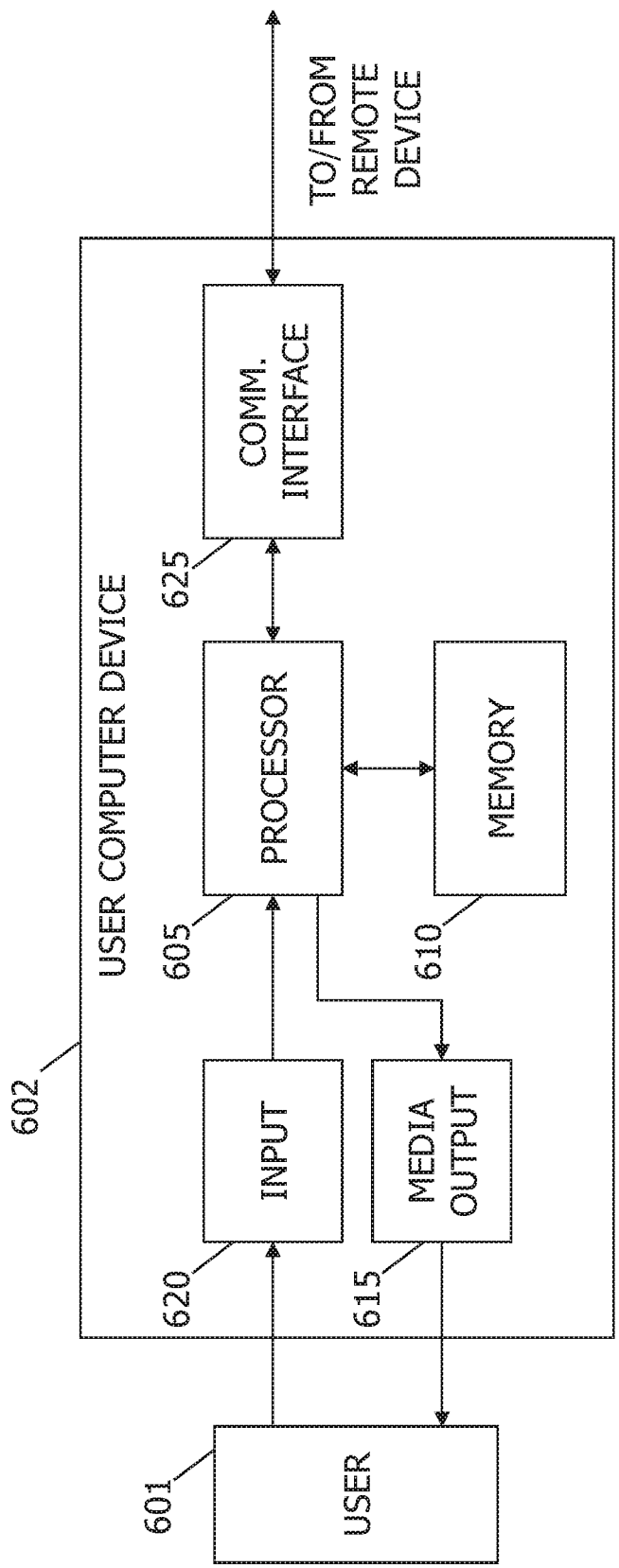

FIG. 6 illustrates an example configuration of a client computing device 602. Client computing device 602 may include, but is not limited to, client systems ("client computing devices") 414 (shown in FIG. 4). Client computing device 602 includes a processor 605 for executing instructions. In some embodiments, executable instructions are stored in a memory area 610. Processor 605 may include one or more processing units (e.g., in a multi-core configuration). Memory area 610 is any device allowing information such as executable instructions and/or other data to be stored and retrieved. Memory area 610 may include one or more computer-readable media.

Client computing device 602 also includes at least one media output component 615 for presenting information to a user 601. Media output component 615 is any component capable of conveying information to user 601. In some embodiments, media output component 615 includes an output adapter such as a video adapter and/or an audio adapter. An output adapter is operatively coupled to processor 605 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 602 includes an input device 620 for receiving input from user 601. Input device 620 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 615 and input device 620.

Client computing device 602 may also include a communication interface 625, which is communicatively couplable to a remote device such as server system 501 or a web server operated by a merchant. Communication interface 625 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 610 are, for example, computer-readable instructions for providing a user interface to user 601 via media output component 615 and, optionally, receiving and processing input from input device 620. A user interface may include, among other possibilities, a web browser and client application. Web browsers enable users 601 to display and interact with media and other information typically embedded on a web page or a website from a web server associated with a merchant. A client application allows users 601 to interact with a server application associated with, for example, a merchant. The user interface, via one or both of a web browser and a client application, facilitates display of message tracking results by message tracking computing device 412.

Figure 7:
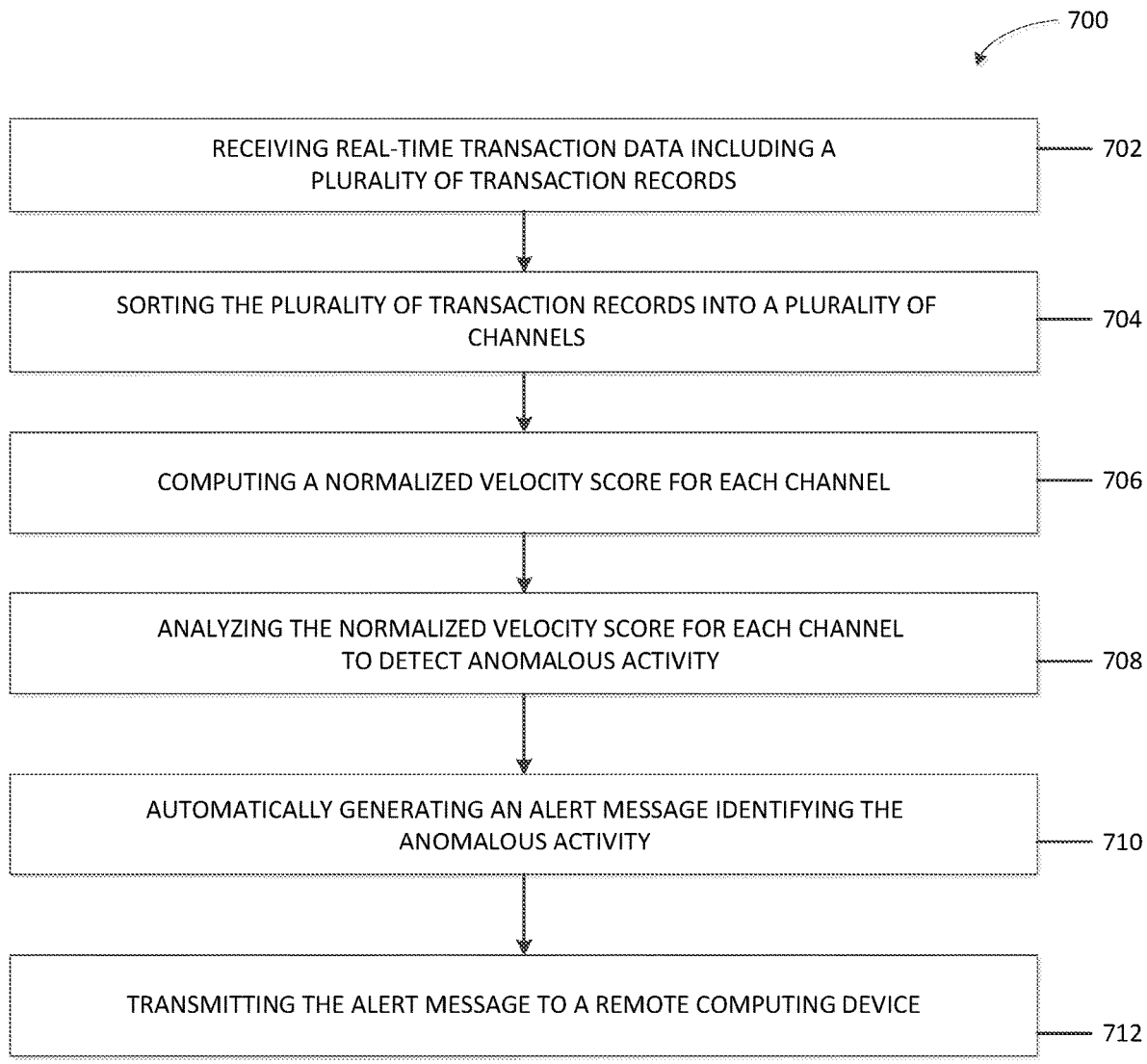

FIG. 7 is a flow diagram of an example method 700 for identifying anomalous activity in real-time based on normalized velocity scores. Method 700 may be implemented, for example, using message tracking computing device 412 (shown in FIG. 1).

Method 700 includes receiving 702, from a payment processing network (such as interchange network 28 shown in FIG. 1), real-time transaction data including a plurality of transaction records. Each transaction record is associated with a payment transaction conducted over the payment processing network.

In the example embodiment, method 700 further includes sorting 704 the plurality of transaction records into a plurality of channels. Each channel of the plurality of channels represents a different type of transaction. In some embodiments, the plurality of channels includes one or more of ATM transactions, card not present transactions, point-of-sale transactions, quasi transactions, cross-border transactions, approved transactions, and declined transactions.

In the example embodiment, method 700 includes computing 706 a normalized velocity score for each channel of the plurality of channels. Specifically the normalized velocity scores is computed 706 by computing a streaming mean for a subset of transaction records, computing a streaming standard deviation for the subset of transaction records, and computing the normalized velocity score based on the streaming mean, the streaming standard deviation, and a transaction ratio for the subset of transaction records.

Further, method 700 includes analyzing 708 the computed normalized velocity score for each channel to detect anomalous activity. For example, the normalized velocity score may be analyzed 708 using a threshold score, historical normalized velocity scores, and/or machine learning algorithms.

In the example embodiment, method 700 further includes automatically generating 710 an alert message identifying the anomalous activity, and transmitting 712 the alert message to a remote computing device. For example, the alert message may be transmitted to a merchant computing device (e.g., associated with merchant 24 shown in FIG. 1), an acquirer computing device (e.g., associated with merchant bank 26 shown in FIG. 1), an issuer computing device (e.g., associated with issuer bank 30 shown in FIG. 1), and/or a cardholder computing device (e.g., associated with cardholder 22 shown in FIG. 1).

In some embodiments, the message tracking computing device 412 computes a streaming mean by computing a time difference between a first time associated with the transaction record and a second time associated with the most recent transaction record in the real-time transaction data before the transaction record. Then the message tracking computing device 412 computes a velocity decay parameter based on the time difference. And the message tracking computing device 412 computes the streaming mean based on the velocity decay parameter.

In some further embodiments, the message tracking computing device 412 computes a mean transaction ratio from the transaction ratios for all the transaction record in the real-time transaction data. Then the message tracking computing device 412 computes a transaction ratio standard deviation from the transaction ratios for all the transaction record in the real-time transaction data. And then message tracking computing device 412 computes a population velocity score for the subset of transaction records based on the mean transaction ratio and the transaction ratio standard deviation.

In some embodiments, to transmit the alert message, message tracking computing device 412 transmits the alert message to at least one of a merchant computing device, an acquirer computing device, an issuer computing device, and a cardholder computing device.

In still further embodiments, to analyze the computed normalized velocity score for each channel, the message tracking computing device 412 analyzes the computed normalized velocity score for each channel within thirty seconds of receipt of the real-time transaction data from the payment processing network.

In some further embodiments, to analyze the computed normalized velocity score for each channel, the message tracking computing device 412 compares the normalized velocity score for each channel to a model of anomalous activity. The model includes a plurality of weights associated with the normalized velocity scores for each channel of the plurality of channels. The message tracking computing device 412 receives a plurality of historical transaction data including a plurality of transaction records associated with an anomalous activity. The message tracking computing device 412 sorts the plurality of historical transaction data into the plurality of channels. The message tracking computing device 412 calculates a normalized velocity score for each channel. Then the message tracking computing device 412 generates the model based on the plurality of normalized vector scores.

A processor or a processing element in the embodiments described herein may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, and/or other data.

Based upon these analyses, the processing element may learn how to identify characteristics and patterns that may then be applied to training models, analyzing transaction and authentication data, and detecting and analyzing risk.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A message tracking computing device for identifying anomalous activity in real-time, the message tracking computing device comprising at least one processor in communication with at least one memory, the at least one processor programmed to:
   receive, from a payment processing network, real-time transaction data including a plurality of real-time transaction records, each transaction record associated with a payment transaction conducted over the payment processing network;
   sort the plurality of real-time transaction records into a plurality of channels, wherein each channel of the plurality of channels represents a different type of transaction, each type of transaction represented by one of the channels includes one of ATM transactions, card-not-present transactions, point-of-sale transactions, quasi transactions, cross-border transactions, approved transactions, and declined transactions, wherein each channel includes a plurality of transactions of the corresponding transaction type from a plurality of individuals and a plurality of institutions;
   for each channel and corresponding type of transaction, compute, in real-time, a normalized velocity score by:
      computing a streaming mean for at least one transaction record associated with the corresponding channel;
      computing a streaming standard deviation for the at least one transaction record; and
      computing the normalized velocity score based on the streaming mean, the streaming standard deviation, and a transaction ratio for the at least one transaction record;
   analyze the computed normalized velocity score for each channel to detect anomalous activity;
   automatically generate an alert message identifying the anomalous activity; and
   transmit the alert message to a remote computing device.

2. The message tracking computing device of claim 1, wherein to compute a streaming mean, the at least one processor is programmed to:
   compute a time difference between a first time associated with the transaction record and a second time associated with the most recent transaction record in the real-time transaction data before the transaction record;
   compute a velocity decay parameter based on the time difference; and
   compute the streaming mean based on the velocity decay parameter.

3. The message tracking computing device of claim 1, wherein the at least one processor is further programmed to:
   compute a mean transaction ratio from the transaction ratios for all the transaction records in the real-time transaction data;
   compute a transaction ratio standard deviation from the transaction ratios for all the transaction records in the real-time transaction data; and
   compute a population velocity score for the at least one transaction record based on the mean transaction ratio and the transaction ratio standard deviation.

4. The message tracking computing device of claim 1, wherein to transmit the alert message, the at least one processor is programmed to transmit the alert message to at least one of a merchant computing device, an acquirer computing device, an issuer computing device, and a cardholder computing device.

5. The message tracking computing device of claim 1, wherein to analyze the computed normalized velocity score for each channel, the at least one processor is programmed to analyze the computed normalized velocity score for each channel within thirty seconds of receipt of the real-time transaction data from the payment processing network.

6. The message tracking computer device of claim 1, wherein to analyze the computed normalized velocity score for each channel, the at least one processor is programmed to compare the normalized velocity score for each channel to a model of anomalous activity, wherein the model includes a plurality of weights associated with the normalized velocity scores for each channel of the plurality of channels.

7. The message tracking computer device of claim 6, wherein the at least one processor is further programmed to:
receive a plurality of historical transaction data including a plurality of transaction records associated with an anomalous activity;
sort the plurality of historical transaction data into the plurality of channels;
calculate a normalized velocity score for each channel; and
generate the model based on the plurality of normalized vector scores.

8. A method for identifying anomalous activity in real-time using a message tracking computing device communicatively coupled to a payment processing network, the method comprising:
receiving, at the message tracking computing device, from the payment processing network, real-time transaction data including a plurality of real-time transaction records, each transaction record associated with a payment transaction conducted over the payment processing network;
sorting the plurality of real-time transaction records into a plurality of channels, wherein each channel of the plurality of channels represents a different type of transaction, each type of transaction represented by one of the channels includes one of ATM transactions, card-not-present transactions, point-of-sale transactions, quasi transactions, cross-border transactions, approved transactions, and declined transactions, wherein each channel includes a plurality of transactions of the corresponding transaction type from a plurality of individuals and a plurality of institutions;
for each channel and corresponding type of transaction, computing, in real-time using the message tracking computing device, a normalized velocity score by:
computing a streaming mean for at least one transaction record;
computing a streaming standard deviation for the at least one transaction record; and
computing the normalized velocity score based on the streaming mean, the streaming standard deviation, and a transaction ratio for the at least one transaction record;
analyzing, using the message tracking computing device, the computed normalized velocity score for each channel to detect anomalous activity;
automatically generating, using the message tracking computing device, an alert message identifying the anomalous activity; and
transmitting, using the message tracking computing device, the alert message to a remote computing device.

9. The method of claim 8, wherein computing a streaming mean comprises:
computing a time difference between a first time associated with the transaction record and a second time associated with the most recent transaction record in the real-time transaction data before the transaction record;
computing a velocity decay parameter based on the time difference; and
computing the streaming mean based on the velocity decay parameter.

10. The method of claim 8, further comprising:
computing a mean transaction ratio from the transaction ratios for all the transaction records in the real-time transaction data;
computing a transaction ratio standard deviation from the transaction ratios for all the transaction records in the real-time transaction data; and
computing a population velocity score for the at least one transaction record based on the mean transaction ratio and the transaction ratio standard deviation.

11. The method of claim 8, wherein transmitting the alert message comprises transmitting the alert message to at least one of a merchant computing device, an acquirer computing device, an issuer computing device, and a cardholder computing device.

12. The method of claim 8, wherein analyzing the computed normalized velocity score for each channel further comprises analyzing the computed normalized velocity score for each channel within thirty seconds of receipt of the real-time transaction data from the payment processing network.

13. The method of claim 8, wherein analyzing the computed normalized velocity score for each channel further comprises comparing the normalized velocity score for each channel to a model of anomalous activity, wherein the model includes a plurality of weights associated with the normalized velocity scores for each channel of the plurality of channels.

14. The method of claim 13 further comprising:
receiving a plurality of historical transaction data including a plurality of transaction records associated with an anomalous activity;
sorting the plurality of historical transaction data into the plurality of channels;
calculating a normalized velocity score for each channel; and
generating the model based on the plurality of normalized vector scores.

15. A tangible computer-readable storage medium having computer-executable instructions embodied thereon, wherein when executed by a message tracking computing device including at least one processor in communication with a memory, the computer-readable instructions cause the message tracking computing device to:
receive, from a payment processing network, real-time transaction data including a plurality of real-time transaction records, each transaction record associated with a payment transaction conducted over the payment processing network;
sort the plurality of real-time transaction records into a plurality of channels, wherein each channel of the plurality of channels represents a different type of transaction, each type of transaction represented by one of the channels includes one of ATM transactions, card-not-present transactions, point-of-sale transactions, quasi transactions, cross-border transactions, approved transactions, and declined transactions, wherein each channel includes a plurality of transactions of the corresponding transaction type from a plurality of individuals and a plurality of institutions;
for each channel and corresponding type of transaction, compute, in real-time, a normalized velocity score by:
computing a streaming mean for at least one transaction record associated with the corresponding channel;
computing a streaming standard deviation for the at least one transaction record; and
computing the normalized velocity score based on the streaming mean, the streaming standard deviation, and a transaction ratio for the at least one transaction record;

analyze the computed normalized velocity score for each channel to detect anomalous activity;

automatically generate an alert message identifying the anomalous activity; and transmit the alert message to a remote computing device.

16. The tangible computer-readable storage medium of claim 15, wherein to compute a streaming mean, the instructions cause the message tracking computing device to:

compute a time difference between a first time associated with the transaction record and a second time associated with the most recent transaction record in the real-time transaction data before the transaction record;

compute a velocity decay parameter based on the time difference; and compute the streaming mean based on the velocity decay parameter.

17. The tangible computer-readable storage medium of claim 15, wherein the instructions further cause the message tracking computing device to:

compute a mean transaction ratio from the transaction ratios for all the transaction records in the real-time transaction data;

compute a transaction ratio standard deviation from the transaction ratios for all the transaction records in the real-time transaction data; and compute a population velocity score for the at least one transaction record based on the mean transaction ratio and the transaction ratio standard deviation.

18. The tangible computer-readable storage medium of claim 15, wherein the real-time transaction data includes transaction records for transactions conducted over a predetermined period of time using payment cards associated with a predefined range of accounts.

* * * * *